United States Patent
Li et al.

(10) Patent No.: US 11,272,176 B2
(45) Date of Patent: *Mar. 8, 2022

(54) ENCODING PROCESSING METHOD AND DEVICE, DECODING PROCESSING METHOD AND DEVICE, ENCODER, AND DECODER

(71) Applicant: ZTE Corporation, Guangdong (CN)

(72) Inventors: Ming Li, Guangdong (CN); Ping Wu, Guangdong (CN); Guoqiang Shang, Guangdong (CN); Zhao Wu, Guangdong (CN)

(73) Assignee: ZTE Corporation, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/149,524

(22) Filed: Jan. 14, 2021

(65) Prior Publication Data

US 2021/0144370 A1    May 13, 2021

Related U.S. Application Data

(63) Continuation of application No. 16/322,694, filed as application No. PCT/CN2016/089452 on Jul. 8, 2016, now Pat. No. 10,904,523.

(30) Foreign Application Priority Data

Oct. 16, 2015  (CN) .......................... 201510673353.2

(51) Int. Cl.
*H04N 19/117*       (2014.01)
*H04N 19/105*       (2014.01)
(Continued)

(52) U.S. Cl.
CPC ......... *H04N 19/117* (2014.11); *H04N 19/105* (2014.11); *H04N 19/132* (2014.11);
(Continued)

(58) Field of Classification Search
CPC .. H04N 19/117; H04N 19/105; H04N 19/176; H04N 19/132; H04N 19/439
(Continued)

(56) References Cited

U.S. PATENT DOCUMENTS 9,445,127 B2   9/2016  Kim et al.
2011/0038414 A1  2/2011  Song et al.
(Continued)

FOREIGN PATENT DOCUMENTS

CN    101715135 A    5/2010
CN    102006467 A    4/2011
(Continued)

OTHER PUBLICATIONS

International Search Report and Written Opinion for International Application No. PCT/CN2016/089452, dated Sep. 28, 2016, 5 pages.

*Primary Examiner* — On S Mung
(74) *Attorney, Agent, or Firm* — Perkins Coie LLP

(57) ABSTRACT

Disclosed are an encoding processing method and device, a decoding processing method and device, an encoder and a decoder. The encoding processing method includes: determining a filtering process to be applied to a pixel in a prediction reference block for an encoding block; filtering the pixel in the prediction reference block according to the filtering process; constructing a pixel prediction value for the encoding block according to a filtered pixel sampling value in the prediction reference block; and encoding the encoding block according to the pixel prediction value.

22 Claims, 5 Drawing Sheets

(51) Int. Cl.
- *H04N 19/132* (2014.01)
- *H04N 19/176* (2014.01)
- *H04N 19/42* (2014.01)
- *H04N 19/593* (2014.01)

(52) U.S. Cl.
CPC ......... *H04N 19/176* (2014.11); *H04N 19/439* (2014.11); *H04N 19/593* (2014.11)

(58) Field of Classification Search
USPC .................................................. 375/240.02
See application file for complete search history.

(56) References Cited

U.S. PATENT DOCUMENTS

| | | |
|---|---|---|
| 2012/0140821 A1 | 6/2012 | Drugeon et al. |
| 2015/0023405 A1 | 1/2015 | Joshi et al. |
| 2015/0055703 A1 | 2/2015 | Pang et al. |
| 2015/0334417 A1 | 11/2015 | Amon et al. |
| 2017/0006285 A1 | 1/2017 | Lin et al. |

FOREIGN PATENT DOCUMENTS

| | | | |
|---|---|---|---|
| CN | 103168471 | A | 6/2013 |
| CN | 103813176 | A | 5/2014 |
| CN | 104333759 | A | 2/2015 |
| CN | 104683805 | A | 6/2015 |
| WO | 2006039843 | A1 | 4/2006 |
| WO | 2012134085 | A2 | 10/2012 |

# ENCODING PROCESSING METHOD AND DEVICE, DECODING PROCESSING METHOD AND DEVICE, ENCODER, AND DECODER

CROSS-REFERENCE TO RELATED APPLICATIONS

This application is a continuation of U.S. patent application Ser. No. 16/322,694, filed on Feb. 1, 2019, which is a U.S. National Stage Application, under 35 U.S.C. 371, of International Patent Application No. PCT/CN2016/089452, filed on Jul. 8, 2016, which claims priority to Chinese Patent Application No. 201510673353.2, filed on Oct. 16, 2015, the contents of each of which are incorporated herein by reference in their entireties.

TECHNICAL FIELD

The present application relates to, but is not limited to, the field of communications, and in particular, relates to an encoding processing method and device, a decoding processing method and device, an encoder and a decoder.

BACKGROUND

In the screen content coding (SCC) standard which is being established based on extensions of the H.265/high efficiency video coding (HEVC) standard, an intra block copying (IBC) mode is adopted. The IBC uses a reconstructed two-dimensional pixel block in the current picture as a prediction reference block for the current block. Furthermore, the IBC uses a relative offset between the prediction reference block and the current block to locate the prediction reference block. The offset may be called a block copying vector (BV). In a decoding process specified by the SCC standard, the IBC mode is incorporated into an inter prediction mode by placing a current decoding picture into a reference picture list and by using a data processing flow and a parameter coding mode of the inter prediction based on the H.265/HEVC standard. When a reference picture index (refIdx) of a decoding block using the inter prediction points to a current decoding picture, the decoding block uses the IBC mode. At this time, a motion vector (MV) corresponding to the decoding block and used for identifying the relative offset between the current decoding block and the prediction reference block in the reference picture is used as the BV of the IBC mode.

To further improve the compression coding efficiency and subjective quality, H.264/advanced video coding (AVC) introduces a deblocking filter (DF) into a prediction compensation loop of the inter prediction. H.265/HEVC inherits this design, and adds a sample adaptive offset (SAO) filter behind the DF in a cascading manner. The DF and the SAO form a loop filtering process in the H.265/HEVC standard. The inter prediction coding efficiency and the subjective quality of the conventional inter prediction mode are greatly improved by using the DF and the loop filtering.

SUMMARY

The following is a summary of the subject matter described in detail in the preset disclosure. This summary is not intended to limit the scope of the claims.

The IBC mode is combined with the inter prediction mode. As in the conventional intra prediction mode, a pixel sampling value in the prediction reference block in the IBC mode is not processed by an in-loop filtering process, so the in-loop filtering process is not used to improve the prediction loop of the IBC. Furthermore, quantization distortion such as blockiness also directly affects the prediction efficiency of the IBC mode.

The present disclosure provides an encoding processing method and device, a decoding processing method and device, an encoder and a decoder, to solve the problem in the related art that no filtering process is performed on the picture in the IBC mode and thus the prediction efficiency of the IBC is low.

An encoding processing method is provided and includes: determining a filtering process to be applied to a pixel in a prediction reference block for an encoding block; filtering the pixel in the prediction reference block according to the filtering process; constructing a pixel prediction value for the encoding block according to a filtered pixel sampling value in the prediction reference block; and encoding the encoding block according to the pixel prediction value.

In an exemplary embodiment, the step of determining the filtering process to be applied to the pixel in the prediction reference block for the encoding block includes: determining a filtering mode to be applied to the filtering process and a filtering parameter to be applied to the filtering process.

In an exemplary embodiment, the step of determining the filtering mode and the filtering parameter to be applied to the filtering process includes:
determining the filtering mode and the filtering parameter according to at least one of the following information for determining a filtering process parameter: encoding parameter information of an encoded block, a part of or all of reconstructed pixel sampling values of a picture in which the prediction reference block is located, and a part of or all of pixel sampling values of a picture in which the encoding block is located.

In an exemplary embodiment, the method further includes:
selecting a filter for performing the filtering process from a filter set, setting parameter information indicating the selected filter as a corresponding parameter of the filtering mode; determining a filter parameter of the selected filter, setting information indicating the determined filter parameter as a corresponding parameter of the filtering parameter, where the filter set includes at least one of the following filter banks:
a filter whose shape and filter parameter are preset;
a filter whose filter shape is preset and whose filter parameter is determined according to the information for determining the filtering process parameter;
a filter determined according to the information for determining the filtering process parameter, the filter parameter of the filter is preset;
a filter whose shape and filter parameter are determined according to the information for determining the filtering process parameter;
a filter using a filter shape and a filter parameter of an encoded block; and
a filter using the filter shape of the encoded block, and using the filter parameter determined according to the information for determining the filtering process parameter.

In an exemplary embodiment, the method further includes: writing the corresponding parameter of the filtering mode and the corresponding parameter of the filtering parameter into a bitstream.

In an exemplary embodiment, the step of determining the filtering mode to be applied to the filtering process and the filtering parameter to be applied to the filtering process includes: determining the filtering mode and the filtering parameter used by the prediction reference block corresponding to the encoding block by using an encoded pixel sample value in combination with the encoding parameter information of the encoded block.

In an exemplary embodiment, the step of filtering the pixel in the prediction reference block according to the filtering process includes:

filtering one or more components of the pixel of the prediction reference block according to the determined filtering process.

In an exemplary embodiment, the step of constructing the pixel prediction value according to the pixel sampling value in the prediction reference block processed by the filtering process includes:

taking the pixel sampling value as the pixel prediction value; or taking a weighted sum of a plurality of pixel sampling values as the pixel prediction value.

In an exemplary embodiment, the step of constructing the pixel prediction value according to the pixel sampling value in the prediction reference block processed by the filtering process includes:

linearly processing the pixel sampling value or a weighted sum of a plurality of pixel sampling values by using a multiplicative factor and/or an additive offset, and taking the linearly processed pixel sampling value as the pixel prediction value.

In an exemplary embodiment, before constructing the pixel prediction value according to the pixel sampling value, the method further includes:

determining a position of the prediction reference block.

In an exemplary embodiment, when the filtering mode indicates that the pixel in the prediction reference block is filtered by using a plurality of cascaded filters, the pixel in the prediction reference block is filtered in a set cascading order of the cascaded filters.

In an exemplary embodiment, the cascading order of the cascaded filters includes:

a preset cascading order of the cascaded filters; or a cascading order of the cascaded filters indicated by the filtering mode.

In an exemplary embodiment, the method further includes: determining control indication information in the filtering process, and writing the control indication information into a bitstream.

In an exemplary embodiment, the control indication information is written into at least one of the following bitstreams: a parameter set bitstream; a slice header information bitstream; a bitstream corresponding to a block layer data unit where the encoding block is located; a bitstream corresponding to a prediction block data unit in the encoding block; a bitstream corresponding to user-defined data; and a bitstream corresponding to supplemental extension information data.

A decoding processing method is provided and includes: determining a filtering process to be applied to a pixel in a prediction reference block for a decoding block; processing a pixel sampling value in the prediction reference block by using the determined filtering process; and constructing a pixel prediction value for the decoding block by using the processed pixel sampling value.

In an exemplary embodiment, before determining the filtering process to be applied to the pixel in the prediction reference block for the decoding block, the method further includes: obtaining position information of the prediction reference block, where the position information includes: a relative offset between the decoding block and the prediction reference block and/or an index of a picture where the prediction reference block is located.

In an exemplary embodiment, the step of determining the filtering process to be applied to the pixel in the prediction reference block includes: determining a filtering mode to be employed by the filtering process and a filtering parameter to be applied to the filtering process.

In an exemplary embodiment, the method further includes: parsing a bitstream, and obtaining a parameter indicating the filtering mode and a filtering parameter applied to indicating that the pixel in the prediction reference block is processed in the filtering mode according to a result of parsing.

In an exemplary embodiment, the method further includes: selecting a filter for performing the filtering process from a filter set according to the parameter of the filtering mode, and setting a filter parameter of the selected filter according to the filtering parameter, where the filter set includes at least one of the following filter banks:

a filter using a preset shape and a preset filtering parameter;

a filter using a preset shape and the filtering parameter;

a filter using a shape indicated by the parameter of the filtering mode, and using a preset filter parameter;

a filter using a shape indicated by the parameter of the filtering mode and using the filter parameter indicated by the filtering parameter;

a filter using a filter shape and a filter parameter of a decoded block; and a filter using the filter shape of the decoded block, and using the filter parameter indicated by the filtering parameter.

In an exemplary embodiment, the step of determining the filtering mode to be applied to the filtering process and the filtering parameter to be applied to the filtering process includes:

determining the filtering mode and the filtering parameter used by the prediction reference block corresponding to the decoding block by using a decoded pixel sample value and decoding parameter information of a decoded block.

In an exemplary embodiment, the step of processing the pixel sampling value in the prediction reference block by using the determined filtering process includes:

filtering one or more components of the pixel in the prediction reference block according to the determined filtering process.

In an exemplary embodiment, the step of constructing the pixel prediction value by using the processed pixel includes:

taking the pixel sampling value as the pixel prediction value; or taking a weighted sum of a plurality of pixel sampling values as the pixel prediction value.

In an exemplary embodiment, the step of constructing the pixel prediction value by using the processed pixel includes:

linearly processing the pixel sampling value or a weighted sum of a plurality of pixel sampling values by using a multiplicative factor and/or an additive offset, and taking the linearly processed pixel sampling value as the pixel prediction value for the decoding block.

In an exemplary embodiment, when the filtering mode indicates that the pixel in the prediction reference block is filtered by using a plurality of cascaded filters, the pixel in the prediction reference block is filtered in a set cascading order of the cascaded filters, where the set cascading order of the cascaded filters is a preset cascading order of the cascaded filters, or a cascading order of the cascaded filters indicated by the filtering mode.

In an exemplary embodiment, the method further includes: determining control indication information in the filtering process, and writing the control indication information into at least one of the following bitstreams:

a parameter set bitstream; a slice header information bitstream; a bitstream corresponding to a block layer data unit where the decoding block is located; a bitstream corresponding to a prediction block data unit in the decoding block; a bitstream of user-defined data; and a bitstream corresponding to supplemental extension information data.

An encoding processing device includes: a first determining module, which is configured to determine a filtering process to be applied to a pixel in a prediction reference block for an encoding block; a filtering module, which is configured to filter the pixel in the prediction reference block according to the filtering process; a first constructing module, which is configured to construct a pixel prediction value for the encoding block according to a filtered pixel sampling value in the prediction reference block; and an encoding module, which is configured to encode the encoding block according to the pixel prediction value.

In an exemplary embodiment, the first determining module is configured to determine a filtering mode to be applied to the filtering process and a filtering parameter to be applied to the filtering process.

In an exemplary embodiment, the first determining module is configured to determine the filtering mode and the filtering parameter according to at least one of the following information for determining a filtering process parameter: encoding parameter information of an encoded block, a part or all of reconstructed pixel sampling values of a picture in which the prediction reference block is located, and a part or all of pixel sampling values of a picture in which the encoding block is located.

A decoding processing device includes: a second determining module, which is configured to determine a filtering process to be applied to a pixel in a prediction reference block for a decoding block; a processing module, which is configured to process a pixel sampling value in the prediction reference block by using the determined filtering process; and a second constructing module, which is configured to construct a pixel prediction value for the decoding block by using the processed pixel sampling value.

In an exemplary embodiment, the apparatus further includes:

an obtaining module, which is configured to obtain position information of the prediction reference block, where the position information includes: a relative offset between the encoding block and the prediction reference block and/or an index of a picture where the prediction reference block is located.

In an exemplary embodiment, the second determining module is configured to determine a filtering mode and a filtering parameter of the filtering process.

An encoder includes any encoding processing device described above.

A decoder includes any decoding processing device described above.

A computer-readable storage medium stores computer-executable instructions. When executed by a processor, the instructions execute the method described above.

According to the embodiments of the present disclosure, a prediction pixel value in an encoding block in an encoding picture is determined by a filtering process performed on a prediction reference block corresponding to the encoding block, and then the encoding block in the encoding picture is encoded. Thus, the above technical solution solves the problem in the related art that the picture is not filtered in the IBC mode and the prediction efficiency of the IBC mode is low, and improves the encoding efficiency and encoding quality of the IBC mode.

Other aspects can be understood after the drawings and detailed description are read and understood.

DETAILED DESCRIPTION

Hereinafter the present disclosure will be described in detail with reference to the drawings in conjunction with the embodiments. It is to be noted that if not in collision, the embodiments and features therein in the present application may be combined with each other.

Additional features and advantages of the embodiments of the preset disclosure will be set forth in the description which follows, and in part will become apparent in the description, or may be learned by practice of the embodiments of the present disclosure. The object and other advantages of the present application can be implemented and obtained through the structures especially indicated in the description, claims and drawings.

Technical solutions in embodiments of the present disclosure will be described clearly and completely in conjunction with the drawings in the embodiments of the present disclosure. Apparently, the embodiments described herein are part, not all of the embodiments of the present invention. Based on the embodiments of the present disclosure, other embodiments obtained by those of ordinary skill in the art without creative work are within the scope of the present application.

Figure 1:
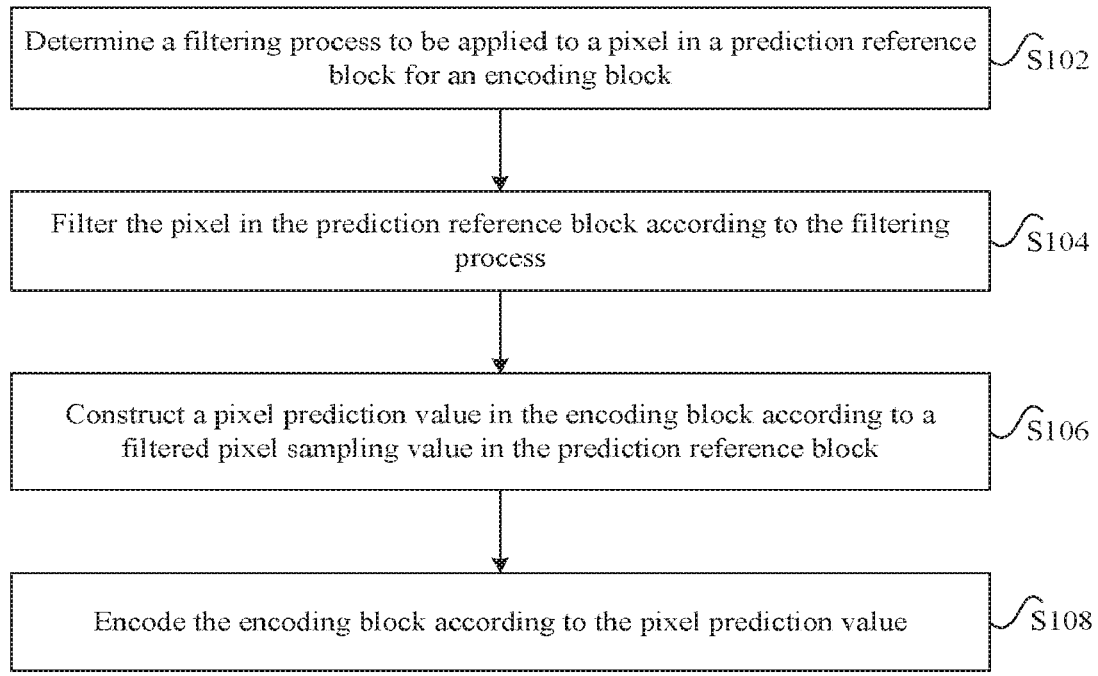
FIG. 1 is a flowchart of an encoding processing method according to an embodiment of the present disclosure.

An embodiment of the present disclosure further provides an encoding processing method. FIG. 1 is a flowchart of the encoding processing method according to the embodiment of the present disclosure. As shown in FIG. 1, the method includes the steps described below.

In step S102, a filtering process to be applied to a pixel in a prediction reference block for an encoding block is determined.

In step S104, the pixel in the prediction reference block is filtered according to the filtering process.

In step S106, a pixel prediction value for the encoding block is constructed according to a pixel sampling value in the prediction reference block processed by the filtering process.

In step S108, the encoding block is encoded according to the pixel prediction value.

With the above steps in the technical solution, a filtering process is performed on a prediction reference block for an encoding block in an encoding picture so as to determine a prediction pixel value in the encoding block, and further the encoding block in the encoding picture is encoded. Thus, the prediction efficiency problem of the IBC mode in the related art due to no filtering process performed on the picture is solved, and the encoding efficiency and encoding quality of the IBC mode are improved.

The encoding block described above is located in a picture to be encoded.

In an exemplary embodiment, the step of determining the filtering process to be applied to the pixel in the prediction reference block for the encoding block in the encoding picture may be implemented by determining a filtering mode and a filtering parameter used in the filtering process. The step of determining the filtering mode and the filtering parameter may be implemented by determining the filtering mode and the filtering parameter according to at least one of the following information for determining a filtering process parameter: encoding parameter information of an encoded block, a part or all of reconstructed pixel sampling values of a picture in which the prediction reference block is located, and a part or all of pixel sampling values of a picture in which the encoding block is located.

An embodiment of the present disclosure further provides the following technical solution. A filter for performing the filtering process is selected from a filter set, and parameter information indicating the selected filter is set to a corresponding parameter of the filtering mode; and a filter parameter of the selected filter is determined, and information of indicating the determined filter parameter is set to a corresponding parameter of the filtering parameter, which may be understood as that the filtering mode corresponds to the filter or the shape of the filter, and that the filtering parameter corresponds to the filter parameter (such as a filter coefficient). In practice, the filtering mode may correspond to a series of parameters, such as the index number of the selected filter in the filter set. The filtering parameter may correspond to the filter coefficient, or may correspond to a parameter indicating the filter coefficient, such as indicating "using a coefficient of a filter of a left neighboring block".

The filter set includes at least one of the following filter banks:

a filter whose shape and filter parameter are preset;

a filter whose filter shape is preset and whose filter parameter is determined according to the information for determining the filtering process parameter;

a filter determined according to the information for determining the filtering process parameter and using a preset filter parameter;

a filter whose shape and filter parameter are determined according to the information for determining the filtering process parameter;

a filter using a filter shape and a filter parameter of an encoded block; and a filter using the filter shape of the encoded block, and using the filter parameter determined according to the information for determining the filtering process parameter. After the filtering mode and the filtering parameter are determined, the corresponding parameter of the filtering mode and the corresponding parameter of the filtering parameter are written into a bitstream.

The process of determining the filtering mode and the filtering parameter may be implemented by the following solution: the filtering mode and the filtering parameter used by the prediction reference block corresponding to the encoding block are determined by using an encoded pixel sample value and the encoding parameter information of the encoded block.

In an embodiment of the present disclosure, the step of constructing the pixel prediction value according to the pixel sampling value may be taking the pixel sampling value as the pixel prediction value; or taking a weighted sum of a plurality of pixel sampling values as the pixel prediction value.

In an alternative example, in the above-mentioned step S104, one or more components of the pixel in the prediction reference block may be filtered according to the determined filtering process. Before the pixel prediction value is constructed according to the pixel sampling value, the method further includes: determining a position of the prediction reference block.

The step S106 may have multiple implementation modes. In an embodiment of the present disclosure, the step S106 may be implemented by: linearly processing the pixel sampling value or a weighted sum of a plurality of pixel sampling values by using a multiplicative factor and/or an additive offset, and taking the linearly processed pixel sampling value as the pixel prediction value.

The linear processing includes the following possible operations.

The used linear operation is $y=ax+b$. This linear operation has three situations. In a case where a is 1, only the additive offset b is used. In a case where b is 0, only the multiplicative factor a is used. Otherwise, both of the multiplicative factor and additive offset are used.

For a data x being weighted, two cases exist. (1) x=one value; and (2) $x=\text{sum}(a(i)*x(i))$. All combinations of the three cases of the linear operation and the two cases of the x need to be summarized.

The above-mentioned technical solution is further improved by an embodiment of the present disclosure, as described below. The filter for performing the filtering process is selected from a filter set according to the parameters of the filtering mode, and the parameter of the selected filter is set according to the filtering parameter, where the filter set includes at least one of the filter banks.

a filter using a preset shape and a preset filtering parameter;

a filter using a preset shape and the above filtering parameter;

a filter whose shape is indicated by the parameter of the filtering mode and using a preset filter parameter;

a filter using the shape indicated by the parameter of the filtering mode and using the filter parameter indicated by the filtering parameter;

a filter using a filter shape and a filter parameter of a decoded block; and a filter using the filter shape of a decoded block, and using the filter parameter indicated by the filtering parameter.

In an exemplary embodiment, when multiple filters are used, the pixel in the prediction reference block is filtered by the multiple filters in a preset sequence.

In an alternative example, the method further includes: determining control indication information in the filtering process, and writing the control indication information into a bitstream, and thereby writing the control indication information into a bitstream corresponding to a bitstream organizational unit in a group including at least one of: a parameter set bitstream; a slice header information bitstream; a bitstream corresponding to a block layer data unit where the encoding block is located; a bitstream corresponding to a prediction block data unit in the encoding block; a bitstream corresponding to user-defined data; and a bitstream corresponding to supplemental extension information data.

It is to be noted that for simple description, the foregoing method embodiments are all expressed as a series of action combinations. However, those skilled in the art should understand that the embodiments of the present disclosure are not limited by the described action sequences, and according to the embodiments of the present disclosure, some steps may be performed in other sequences or concurrently. It is also to be understood by those skilled in the art that the embodiments described herein are optional embodiments and that the actions and modules involved are optional for the present application.

Figure 2:
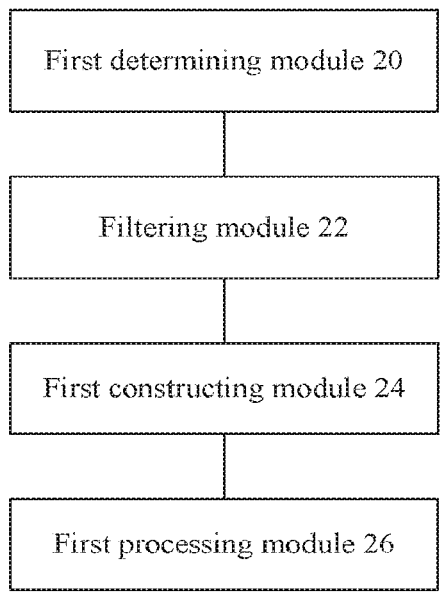
FIG. 2 is a structural diagram of an encoding processing device according to an embodiment of the present disclosure.

An embodiment of the present disclosure further provides an encoding processing device for implementing the above-mentioned embodiments and optional embodiments. What has been described will not be repeated. Modules involved in the device will be described below. As used below, the term "module" may be software, hardware or a combination thereof capable of implementing predetermined functions. The device described below in the embodiment may be implemented by software, but implementation by hardware or by a combination of software and hardware is also possible and conceived. FIG. 2 is a structural diagram of the encoding processing device according to the embodiment of the present disclosure. As shown in FIG. 2, the device includes: a first determining module 20, a filtering module 22, a first constructing module 24, and a first processing module 26.

The first determining module 20 is configured to determine a filtering process to be applied to a pixel in a prediction reference block for an encoding block.

The filtering module 22 is connected to the first determining module 20, and is configured to filter the pixel in the prediction reference block according to the filtering process.

The first constructing module 24 is connected to the filtering module 22, and is configured to construct a pixel prediction value for the encoding block according to a pixel sampling value in the prediction reference block processed by the filtering process.

The first processing module 26 is connected to the first constructing module 24, and is configured to encode the encoding block according to the pixel prediction value.

Through a comprehensive effect of the above modules, a filtering process is performed on a prediction reference block for an encoding block in an encoding picture, and thereby a prediction pixel value in the encoding block is determined, and further the encoding block in the encoding picture is encoded. Thus, the technical solution solves the problem in the related art that no filtering process is performed on the picture in the IBC mode and the prediction efficiency of the IBC mode is low, and improves the encoding efficiency and encoding quality of the IBC mode.

In an exemplary embodiment, the first determining module 20 is configured to determine a filtering mode applied to the filtering process and a filtering parameter applied to the filtering process. The first determining module 20 is configured to determine the filtering mode and the filtering parameter according to at least one of the following information for determining a filtering process parameter: encoding parameter information of an encoded block, a part or all of reconstructed pixel sampling values of a picture in which the prediction reference block is located, and a part or all of pixel sampling values of a picture in which the encoding block is located.

Figure 3:
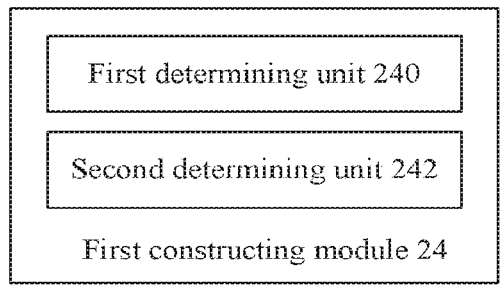
FIG. 3 is a structural diagram of a first constructing module 24 of the encoding processing device according to an embodiment of the present disclosure.

FIG. 3 is a structural diagram of the first constructing module 24 of the encoding processing device according to the embodiment of the present disclosure. The first constructing module 24 includes: a first determining unit 240, which is configured to take the pixel sampling value as the pixel prediction value; or a second determining unit 242, which is configured to take a weighted sum of a plurality of pixel sampling values as the pixel prediction value.

Figure 4:
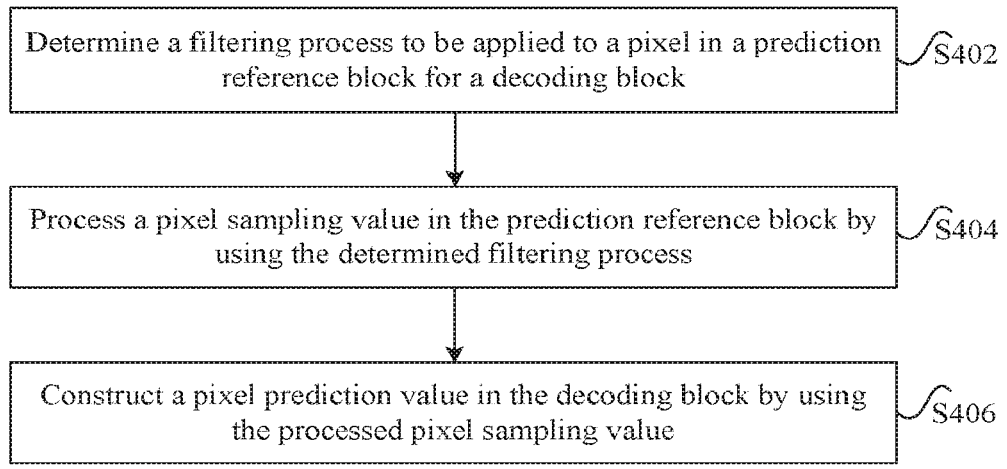
FIG. 4 is a flowchart of a decoding processing method according to an embodiment of the present disclosure.

In addition to the above-mentioned technical solution, an embodiment of the present disclosure further provides a decoding processing method. FIG. 4 is a flowchart of the decoding processing method according to the embodiment of the present disclosure. As shown in FIG. 4, the method includes the steps described below.

In step S402, a filtering process to be applied to a pixel in a prediction reference block for a decoding block is determined.

In step S404, a pixel sampling value in the prediction reference block is processed by using the determined filtering process.

In step S406, a pixel prediction value for the decoding block is constructed by using the processed pixel sampling value.

With the above steps, a filtering process is performed on a prediction reference block for a decoding block in a decoding picture, and thereby a prediction pixel value in the decoding block where the prediction reference block is located is determined, and further the decoding block in the decoding picture is decoded. Thus, the technical solution solves the problem, in the related art, that no filtering process is performed on the picture in the IBC mode and the prediction efficiency of the IBC mode is low, and improves the decoding efficiency and decoding quality of the IBC mode.

In an optional example, before the filtering process to be applied to the pixel in the prediction reference block for the decoding block is determined, the method further includes obtaining position information of the prediction reference block. The position information includes: a relative offset between the decoding block and the prediction reference block and/or an index of a picture where the prediction reference block is located.

In an exemplary embodiment, the step of obtaining the position information and/or shape information of the prediction reference block includes: parsing a received video bitstream, and obtaining, according to a result of the parsing, a parameter indicating the filtering mode and a filtering parameter applied to processing the pixel in the prediction reference block according to the filtering mode.

In an exemplary embodiment, the step of determining the filtering process applied to the pixel in the prediction reference block for the decoding block in the decoding picture may be implemented by determining a filtering mode applied to the filtering process and a filtering parameter applied to the filtering process.

The filtering mode and the filtering parameter applied to the filtering process may be determined by the following technical solution: the filtering mode and the filtering parameter are determined according to at least one of: preconfigured decoding information, and a part or all of the reconstructed pixel sampling values of a decoding picture.

The above-mentioned step S404 may be implemented by the following solution: the pixel sampling value is taken as the pixel prediction value; or a weighted sum of a plurality of pixel sampling values is taken as the pixel prediction value.

In an exemplary embodiment, the above-mentioned method further includes: selecting a filter for performing the filtering process from a filter set according to the parameter of the filtering mode, and setting a parameter of the selected filter according to the filtering parameter. The filter set includes at least one of the following filter banks: a filter using a preset shape and a preset filtering parameter; a filter using the preset shape and the filtering parameter; a filter using a shape indicated by the parameter of the filtering mode and a filter using a preset filter parameter corresponding to the filter; a filter using the shape indicated by the parameter of the filtering mode, and a filter using the filter parameter indicated by the filtering parameter; a filter using a filter shape and a filter parameter of a decoded block; and a filter using the filter shape of the decoded block and using the filter parameter indicated by the filtering parameter.

In an exemplary embodiment, the filtering mode and the filtering parameter used by the prediction reference block corresponding to the encoding block are determined by using a decoded pixel sample value and decoding parameter information of a decoded block.

The above-mentioned S404 is implemented in an optional example in the following manner: one or more components of the pixel in the prediction reference block are filtered according to the determined filtering process.

In an optional example, when a plurality of filters are used, the pixel in the prediction reference block is filtered in a preset sequence, control indication information in the filtering process is determined, and the control indication information is written into a bitstream. In the embodiment of the present disclosure, the control indication information in the filtering process is determined by parsing a bitstream corresponding to a bitstream organizational unit, the bitstream includes at least one of: a parameter set bitstream, a slice header information bitstream, a bitstream corresponding to a block layer data unit where the decoding block is located, a bitstream corresponding to a prediction block data unit in the decoding block, a bitstream of user-defined data, and a bitstream corresponding to supplemental extension information data.

Figure 5:
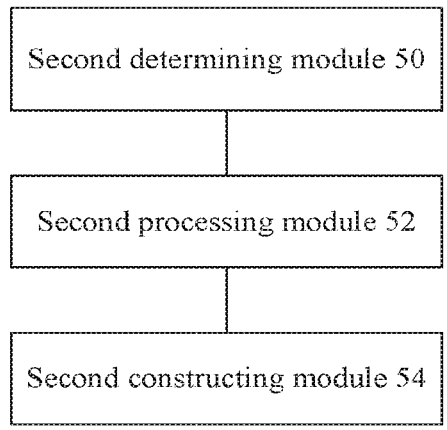
FIG. 5 is a structural diagram of a decoding processing device according to an embodiment of the present disclosure.

An embodiment of the present disclosure further provides a decoding processing device for implementing the above-mentioned embodiments and optional embodiments. What has been described will not be repeated. Modules involved in the device will be described below. As used below, the term "module" may be software, hardware or a combination thereof capable of implementing predetermined functions. The device described below in the embodiment may be implemented by software, but implementation by hardware or by a combination of software and hardware is also possible and conceived. FIG. 5 is a structural diagram of a decoding processing device according to an embodiment of the present disclosure. As shown in FIG. 5, the device includes: a second determining module 50, a second processing module 52, and a second constructing module 54.

The second determining module 50 is configured to determine a filtering process to be applied to a pixel in a prediction reference block for a decoding block.

The second processing module 52 is connected to the second determining module 50, and is configured to process a pixel sampling value in the prediction reference block by using the determined filtering process.

The second constructing module 54 is connected to the second processing module 52, and is configured to construct a pixel prediction value for the encoding block by using the processed pixel sampling value.

Through a comprehensive effect of the above modules, a filtering process is performed on a prediction reference block for a decoding block in a decoding picture, and thereby a prediction pixel value in the decoding block is determined, and further the decoding block in the decoding picture is decoded. Thus, the technical solution solves the low prediction efficiency problem of the IBC mode in the related art caused by no filtering process being performed on the picture in the IBC mode, and improves the decoding efficiency and quality of the IBC mode.

In an exemplary embodiment, the second determining module 50 is configured to determine a filtering mode applied to the filtering process and a filtering parameter applied to the filtering process. Further, the second determining module 50 is configured to determine the filtering mode and the filtering parameter according to at least one of: preconfigured encoding information, and a part or all of the reconstructed pixel sampling values of the encoding picture.

Figure 6:
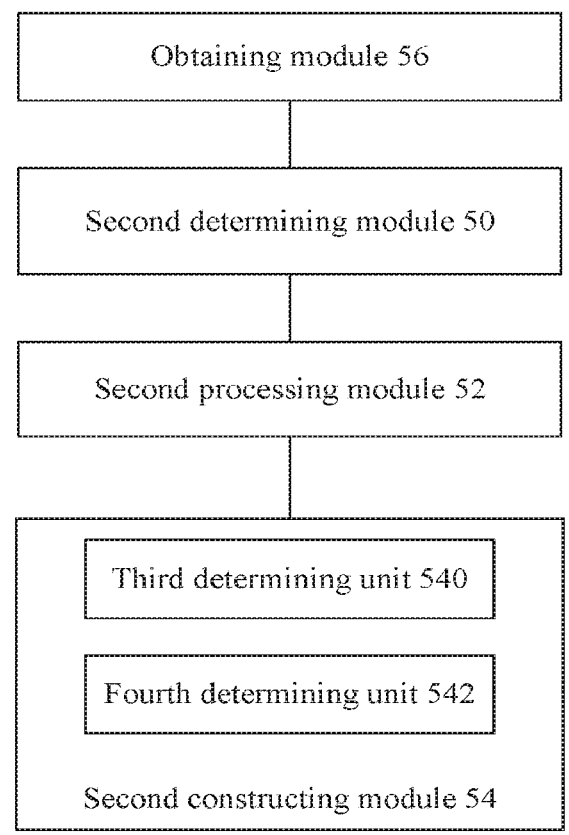
FIG. 6 is another structural diagram of a decoding processing apparatus according to an embodiment of the present disclosure.

FIG. 6 is a structural diagram of another decoding processing device according to an embodiment of the present disclosure. As shown in FIG. 6, the second constructing module 54 includes: a third determining unit 540, which is configured to take the pixel sampling value as the pixel prediction value; or a fourth determining unit 542, which is configured to take a weighted sum of a plurality of pixel sampling values as the pixel prediction value. The decoding processing device further includes an obtaining module 56, which is configured to obtain position information of the prediction reference block. The position information includes: a relative offset between the decoding block and the prediction reference block and/or an index of a picture where the prediction reference block is located.

An embodiment of the present disclosure further provides an encoder, which includes any one of the encoding processing devices described above.

An embodiment of the present disclosure further provides a decoder, which includes any one of the decoding processing devices described above.

To better understand the above-mentioned technical solutions, the above-mentioned technical solutions are described below in conjunction with the exemplary embodiments. The exemplary embodiments described below are not used to limit the technical solutions of the embodiments of the present disclosure.

It is to be noted that the exemplary embodiments described below are only used to explain the above-mentioned technical solutions, and are not necessarily in parallel relationship. The prediction block dividing manner of the IBC is not limited by the embodiments, that is, the prediction block may be a traditional rectangular block or square block, or may be divided by a string of N×1 or 1×N. The string matching method is a special case when the IBC uses the N×1 or 1×N string division method.

Optional Embodiment 1

The optional embodiment 1 of the present disclosure provides a method for constructing a prediction reference block for a decoding block using the IBC mode. The method is used in the decoding process or the decoder using the IBC mode. The method for constructing the prediction reference block for the encoding block using the IBC mode provided by the embodiment is described below.

In step S201, a decoder parses a video bitstream to obtain a prediction parameter of a decoding block.

In a case where the decoding block uses an inter prediction mode and its reference picture index indicates "the decoding block uses a current decoding picture as a reference picture", the above-mentioned decoding block is decoded using the IBC mode.

The decoder obtains a relative position offset vector MV between the decoding block and a reference block thereof.

In step S202, the decoder determines a prediction reference block for the decoding block according to the prediction parameter.

In the case where the IBC mode is used, the decoder determines a position of a pixel in the upper left corner of the reference block in the current decoding picture according to the MV and a position of a pixel in the upper left corner of the decoding block.

The prediction reference block is comprised of pixels included in an area having a shape identical to the decoding block, and the prediction reference block includes the pixel at the upper left corner of the determined reference block.

In step S203, the decoder determines a filtering mode and a filtering parameter according to decoding information field known by the decoder and/or pixel sampling values of a part and/or all of the reconstructed pixels in a picture where the prediction reference block is located.

Alternatively, the decoder parses the bitstream and obtains the filtering mode and the filtering parameter for filtering the pixel sampling values of the pixels in the prediction reference block.

Alternatively, the decoder uses the pixel sampling values of the pixels in the prediction reference block to estimate the DF filtering strength and filtering parameter of the prediction reference block.

Alternatively, the decoder uses the DF filtering strength and filtering parameter, obtainable from the bitstream, of the slice and the coding unit where the pixel in the prediction reference block is located.

Alternatively, the decoder uses the SAO parameter, obtainable from the bitstream, of the coding tree unit (CTU) where the pixel in the prediction reference block is located.

In step S204, the decoder filters the pixel in the prediction reference block using the determined filtering mode and filtering parameter.

The decoder filters one or more components of the pixel in the prediction reference block according to the determined filtering mode and filtering parameter.

When multiple filters are used, the decoder filters the pixel in the prediction reference block in a preset cascading order of the cascaded filters or in a cascading order of the cascaded filters indicated in the bitstream.

In step S205, the decoder constructs a prediction value for the sampling value in the pixel in the decoding block using the filtered pixel sampling value in the prediction reference block.

Alternatively, the decoder directly takes the filtered pixel sampling value in the prediction reference block as the prediction value for the pixel sampling value at the corresponding pixel position in the decoding block.

Alternatively, in a case where the decoding block uses two or more prediction reference blocks, the decoder uses a weighted sum of the filtered pixel sampling values of the two or more prediction reference blocks as the prediction value for the pixel sampling value at the corresponding pixel position in the decoding block.

Alternatively, the decoder uses a multiplicative factor and/or an additive offset to linearly process the prediction value obtained by the above-mentioned method, and takes the processed prediction value as the prediction value for the decoding block. The decoder obtains values of the multiplicative factor and/or the additive offset by parsing the bitstream, or estimates the values of the multiplicative factor and/or the additive offset according to a reference picture.

Optional Embodiment 2

Figure 7:
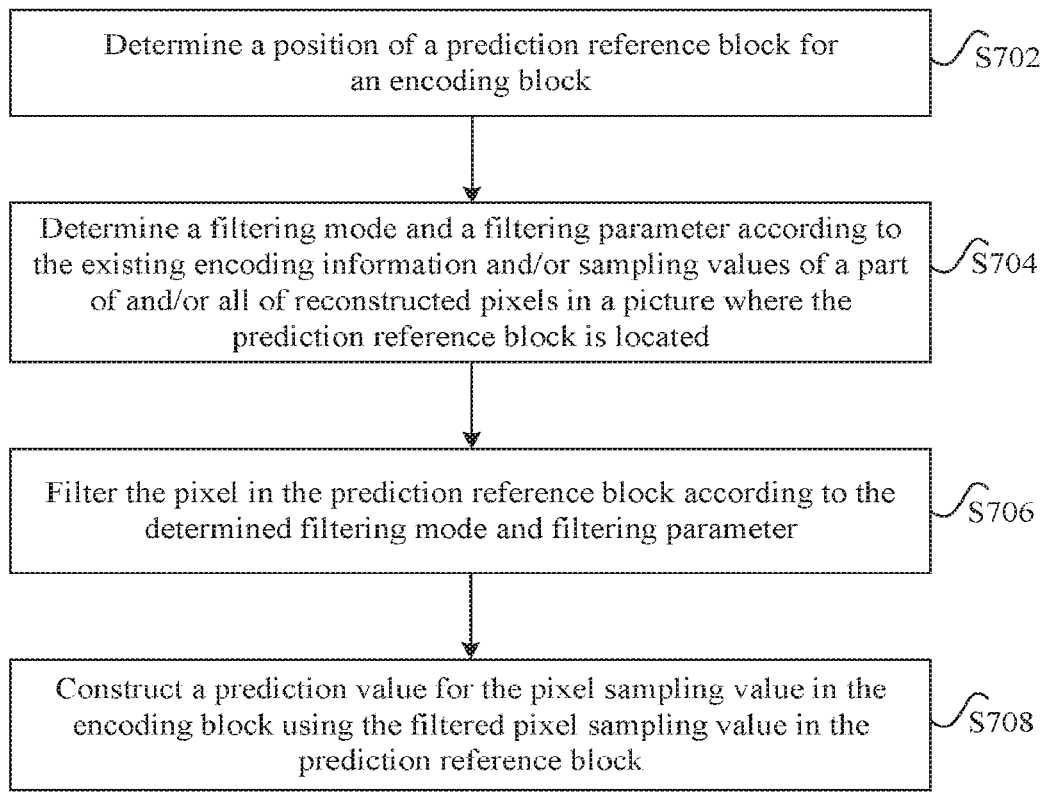
FIG. 7 is a flowchart of an encoding processing method according to an optional embodiment 2 of the present disclosure.

The optional embodiment 2 is an encoding method corresponding to the method for constructing the prediction reference block for the decoding block using the IBC mode described above in the optional embodiment 1, and is applied to an encoding process or an encoder using the IBC mode. A method for constructing a prediction reference block for an encoding block using the IBC mode is shown in FIG. 7, and includes the steps described below.

In step S702, an encoder determines a position of a prediction reference block for an encoding block.

The position of the prediction reference block for the encoding block determined by the encoder includes: a reference picture in which the prediction reference block is located, and a relative position offset between the prediction reference block and the encoding block.

The encoder uses the designed coder optimization algorithm to search for the position of the prediction reference block for the current block.

In the embodiment, a picture in which the prediction reference block for the encoding block using the IBC mode is located is a current encoding picture.

In step S704, the encoder determines a filtering mode and a filtering parameter according to existing coding information and/or pixel sampling values of a part and/or all of the reconstructed pixels of a picture in which the prediction reference block is located.

Alternatively, according to the pixel sampling values in the prediction reference block, the encoding mode used by the pixels in the reference block and other information, the encoder determines the filtering mode and the filtering parameter for filtering the pixel in the prediction reference block, and writes the relevant filtering parameter into the bitstream.

Alternatively, the encoder uses the pixel sampling values in the prediction reference block to estimate the DF filtering strength and filtering parameter of the prediction reference block.

Alternatively, the encoder uses the DF filtering strength and filtering parameter of the slice and the coding unit where the encoded pixel in the prediction reference block is located.

Alternatively, the encoder estimates the SAO parameter of the coding tree unit (CTU) where the pixel in the prediction reference block is located according to the encoded pixel in the prediction reference block in the current picture.

In step S706, the encoder filters the pixel in the prediction reference block according to the determined filtering mode and filtering parameter.

The encoder filters one or more components of the pixel in the prediction reference block according to the determined filtering mode and filtering parameter.

When multiple filters are used, the encoder filters the pixel in the prediction reference block in a preset cascading order of the cascaded filters or in a cascading order of the cascaded filters indicated in the bitstream.

In step S708, the encoder constructs a prediction value for the pixel sampling value in the encoding block using the filtered pixel sampling value in the prediction reference block.

Alternatively, the encoder directly takes the filtered pixel sampling value in the prediction reference block as the prediction value for the pixel sampling value at the corresponding pixel position in the encoding block.

Alternatively, in a case where the encoding block uses two or more prediction reference blocks, the encoder uses a weighted sum of the filtered pixel sampling values in the two or more prediction reference blocks as the prediction value for the pixel sampling value at the corresponding pixel position in the encoding block.

Alternatively, the encoder uses a multiplicative factor and/or an additive offset to linearly process the prediction value obtained using the above-mentioned method, and takes the processed prediction value as the prediction value for the encoding block. The encoder obtains values of the multiplicative factor and/or the additive offset by parsing the bitstream, or estimates the values of the multiplicative factor and/or the additive offset according to a reference picture.

Optional Embodiment 3

Figure 8:
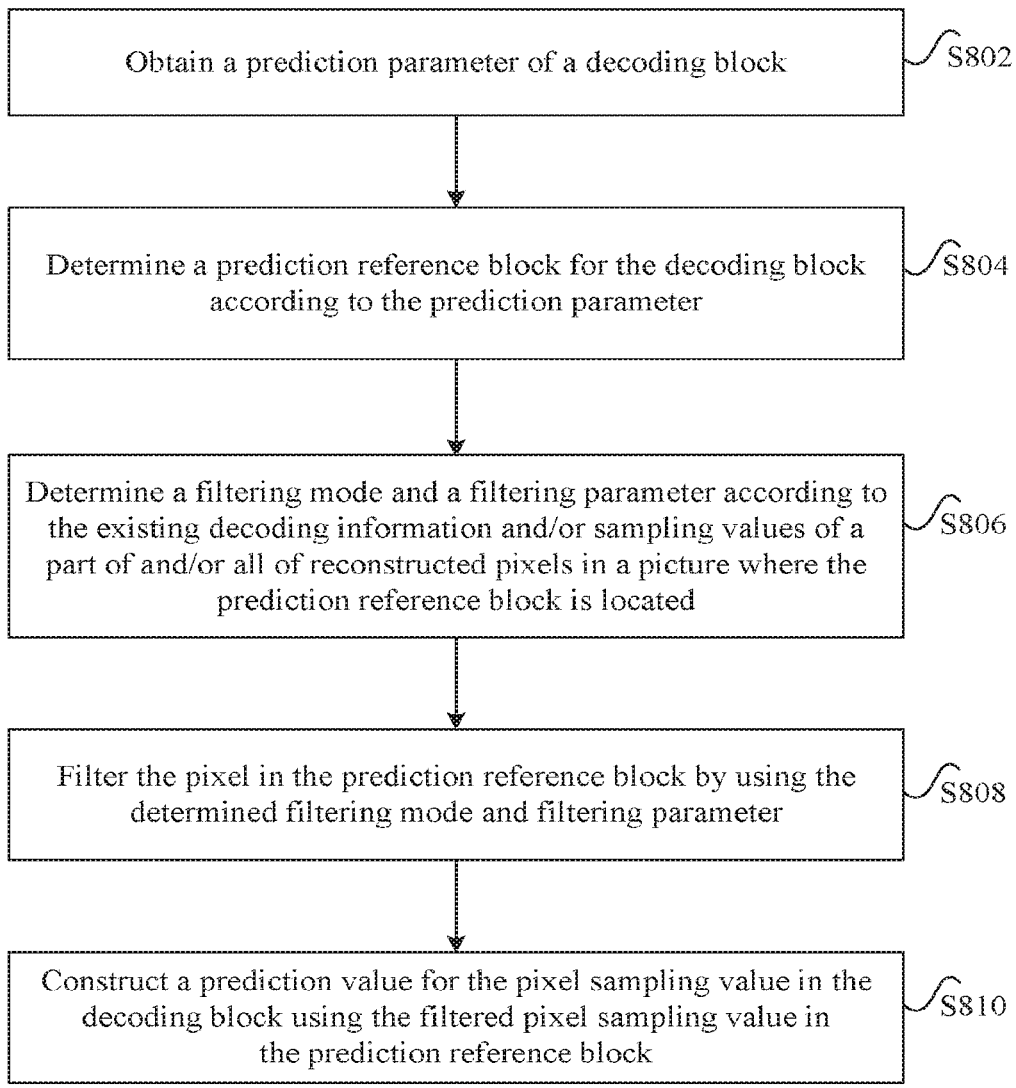
FIG. 8 is a flowchart of a method for constructing a prediction reference block for a decoding block in an inter slice according to an optional embodiment 3 of the present disclosure.

The optional embodiment 3 provides a method for constructing a prediction reference block for a decoding block in an inter slice. The method may be used for constructing a prediction reference block in the IBC mode, and may also be used for constructing a prediction reference block in a conventional inter prediction mode. The method may be applied to a video decoding process or a decoder. As shown in FIG. 8, the method for constructing the prediction reference block for the decoding block provided in the embodiment is described below.

In step S802, a decoder parses a video bitstream to obtain a prediction parameter of a decoding block.

In a case where the decoding block uses an inter prediction mode and its reference picture index (refIdx) indicates "the decoding block uses a current decoding picture as a reference picture", the decoding block is decoded using the IBC mode. Otherwise, the decoding block is decoded using the conventional inter prediction mode.

The decoder obtains a relative position offset vector MV between the decoding block and a reference block thereof.

In step S804, the decoder determines a prediction reference block for the decoding block according to the prediction parameter.

In the case where the IBC mode is used for the decoding block, the decoder determines a position of a pixel at the upper left corner of the reference block in the current decoding picture according to the MV and a position of a pixel in the upper left corner at the decoding block.

In the case where the conventional inter prediction mode is used for the decoding block, the decoder determines a position of a pixel at the upper left corner of the reference block in a reference picture indicated by the reference picture index (refIdx) according to the MV and a position of a pixel at the upper left corner of the decoding block.

The position of the pixel at the upper left corner of the reference block may be determined as a vector sum of the MV and an offset vector between the pixel at the upper left corner of the decoding block and the pixel at the upper left corner of the current decoding picture.

The prediction reference block is comprised of pixels in an area having a shape identical to that of the decoding block including the pixel at the upper left corner of the determined reference block.

In step S806, the decoder determines a filtering mode and a filtering parameter according to the existing decoding information and/or pixel sampling values of a part and/or all of reconstructed pixels of a picture in which the prediction reference block is located.

In the process of parsing the bitstream, the decoder obtains related information for determining the filtering mode and the filtering parameter. The information includes at least one of:

indication information indicating whether to filter the pixel in the prediction reference block;

indication information indicating whether to filter the pixel in the prediction reference block in the IBC mode;

indication information indicating whether to filter the pixel in the prediction reference block in the conventional inter prediction mode;

indication information of a filter used in filtering the pixel in the prediction reference block, which at least includes indication information of a filter type;

indication information of a filter used in filtering the pixel in the prediction reference block in the IBC mode;

indication information of a filter used in filtering the pixel in the prediction reference block in the conventional inter prediction mode;

information of a filtering parameter used in filtering the pixel in the prediction reference block, which at least includes information of a filter coefficient;

filtering parameter information of a filter used in filtering the pixel in the prediction reference block in the IBC mode; and filtering parameter information of a filter used in filtering the pixel in the prediction reference block in the conventional inter prediction mode.

The decoder obtains the above information for determining the filtering mode and the filtering parameter by parsing a bitstream corresponding to a bitstream organizational unit. The bitstream includes at least one of:

one or more parameter set bitstreams;

a slice header information bitstream;

a bitstream corresponding to a block layer data unit where the decoding block is located;

a bitstream corresponding to a prediction block data unit in the decoding block; and a bitstream corresponding to user-defined data and/or a bitstream corresponding to supplemental extension information data.

According to the above information for determining the filtering mode and the filtering parameter, the decoder filters the sampling value in the pixel in the prediction reference block by performing one of the operation manners described below.

In the operation manner 1: both the prediction reference block in the IBC mode and the prediction reference block in the conventional inter prediction mode are filtered, and the same filter is used.

In an operation manner 2: both the prediction reference block in the IBC mode and the prediction reference block in the conventional inter prediction mode are filtered, and different filters are used.

In an operation manner 3: the prediction reference block in the IBC mode is filtered, and the prediction reference block in the conventional inter prediction mode is not filtered.

In an operation manner 4: the prediction reference block in the IBC mode is not filtered, and the prediction reference block in the conventional inter prediction mode is filtered.

In an operation manner 5: neither the prediction reference block in the IBC mode nor the prediction reference block in the conventional inter prediction mode is filtered.

According to the obtained related information for determining the filtering mode and the filtering parameter, the decoder selects a filter for filtering the pixel sampling value in the prediction reference block from a filter set allowed for use, and determines the filtering parameter by using one of the methods described below. The filter set allowed for use includes filters which can be used for filtering the decoding block and/or the prediction reference block for the decoding block included in the picture/slice where the decoding block is located.

In a method 1 for determining the filter, if the selected filter uses a preset shape and filtering parameter, the preset filter shape and the corresponding filter parameter are used.

In a method 2 for determining the filter, if the selected filter uses a preset shape, the preset filter shape and the filter parameter corresponding to the filter shape and obtained by parsing the bitstream are used.

In a method 3 for determining the filter, the filter shape and the corresponding filter parameter obtained by parsing the bitstream are used.

In a method 4 for determining the filter, the filter shape and the filter parameter of a decoded block are used.

In a method 5 for determining the filter, the filter shape of the decoded block and the filter parameter obtained by parsing the bitstream are used.

In a method 6 for determining the filter, the filter shape and the filtering parameter to be used are determined according to the decoded pixel sampling value selectively in conjunction with the related parameter obtained by parsing the bitstream.

For the method 6 for determining the filter, an example of the filtering mode and the filtering parameter used for filtering the pixel sampling value in the prediction reference block for the IBC mode is described below. In the example, the filter set allowed for use includes the DF filter and/or the SAO filter. The method that may be used to determine filtering parameters of the DF and/or the SAO includes at least one of the methods described below.

The decoder parses the bitstream and obtains the filtering mode and the filtering parameter for filtering the pixel sampling value in the prediction reference block.

The decoder uses the pixel sampling value in the pixel in the prediction reference block to estimate the DF filtering strength and filtering parameter for the prediction reference block.

The decoder uses the DF filtering strength and filtering parameter, obtainable from the bitstream, of the slice and the coding unit where the pixel in the prediction reference block is located.

The decoder uses the SAO parameter, obtainable from the bitstream, of the coding tree unit (CTU) where the pixel in the prediction reference block is located.

In particular, the decoder may parse the bitstream information and then determine whether to use the same filter and filtering parameter to filter the pixel sampling values in the prediction reference blocks of all of the decoding blocks using the IBC mode and/or the conventional inter prediction mode in a decoding picture or a decoding slice. In this particular case, the decoder obtains the parameters related to the filtering process in a manner similar to the above-mentioned manner for the decoding block. The process is not limited. In an embodiment, the decoder may filter a prediction reference picture before filtering the decoding block in the decoding picture or in the decoding slice. In an alternative embodiment, in the block layer decoding process, the decoder filters the prediction reference block used by the decoding block, which is different from the processing method in which the prediction reference picture is first filtered in the picture layer or in the slice layer.

In step S808, the decoder uses the determined filtering mode and filtering parameter to filter the pixel in the prediction reference block.

The decoder filters one or more components of the pixel in the prediction reference block according to the determined filtering mode and filtering parameter.

When multiple filters are used, the decoder filters the pixel in the prediction reference block in a preset cascading order of the cascaded filters or in a cascading order of the cascaded filters indicated in the bitstream.

In step S810, the decoder constructs a prediction value for the pixel sampling value in the decoding block using the filtered pixel sampling value in the prediction reference block.

Alternatively, the decoder directly takes the filtered pixel sampling value in the prediction reference block as the prediction value for the pixel sampling value at the corresponding pixel position in the decoding block.

Alternatively, if the decoding block uses two or more prediction reference blocks, the decoder uses a weighted sum of the filtered pixel sampling values of the two or more prediction reference blocks as the prediction value for the pixel sampling value at the corresponding position in the decoding block.

Alternatively, the decoder uses a multiplicative factor and/or an additive offset to linearly process the prediction value obtained using the above-mentioned method, and takes the processed prediction value as the prediction value for the decoding block. The decoder obtains values of the multiplicative factor and/or the additive offset by parsing the bitstream, or estimates the values of the multiplicative factor and/or the additive offset according to a reference picture.

Optional Embodiment 4

The optional embodiment 4 is an encoding method corresponding to the method of constructing a prediction reference block for a decoding block in an inter slice. The method may be used for constructing a prediction reference block in the IBC mode, and may also be used for constructing a prediction reference block in the conventional inter prediction mode. The method may be applied to a video coding process or an encoder. The method of constructing the prediction reference block for the encoding block provided in the embodiment is described below.

In step S501, an encoder determines a position of a prediction reference block for an encoding block.

The position of the prediction reference block for the encoding block determined by the encoder includes: a reference picture in which the prediction reference block is located, and a relative position offset (i.e., MV) between the prediction reference block and the encoding block.

The encoder uses a designed coder optimization algorithm to search for a position of the prediction reference block for the current block. An example of the encoder optimization algorithm is a motion estimation algorithm using rate-distortion criteria, and a fast search algorithm can be used together.

In the embodiment, a picture in which the prediction reference block for the encoding block using the IBC mode is located is the current encoding block picture. The picture in which the prediction reference block for the encoding block using the conventional inter prediction mode is located is not the current encoding picture.

In step S502, the encoder determines a filtering mode and a filtering parameter according to the existing encoding information and/or pixel sampling values of a part and/or all of the reconstructed pixels of a picture in which the prediction reference block is located.

After the step S501 is completed, the encoder determines the filtering mode and the filtering parameter by using the method in the step S502. Alternatively, the encoder may determine the filtering mode and the filtering parameter for a candidate reference picture and MV using the method in the step S502 during the execution of the step S501. Thus, at the end of the execution of the step S501, the encoder may obtain the position of the prediction reference block and the filtering mode and filtering parameter corresponding to the prediction reference block. Nevertheless, in the above two methods, the position of the prediction reference block is known before determining the filtering mode and the filtering parameters.

The encoder selects a filter for filtering the pixel sampling value in the pixel in the prediction reference block from a filter set allowed for use, and determines the filtering parameter. The filter set allowed for use includes filters which may be used for filtering the encoding block and/or the prediction reference block for the encoding block included in the picture/slice where the encoding block is located. The filter set allowed for use includes at least one of the filter banks described below. Each filter bank may include one or more filters.

A filter bank 1 includes a filter whose filter shape and filter parameter are preset.

A filter bank 2 includes a filter whose shape is preset and whose filtering parameter is determined by the encoder.

A filter bank 3 includes a filter whose shape and filter parameter are determined by the encoder.

A filter bank 4 includes a filter using a filter shape and a filter parameter of an encoded block.

A filter bank 5 includes a filter using the filter shape of the encoded block, and a filter parameter determined by the encoder for the current encoding block.

A filter bank 6 includes a filter whose shape and filtering parameter are determined according to a pixel sampling value in an encoded pixel and selectively together with the existing encoding information.

The encoder selects the filter from the filter banks. When a filter whose filter shape and filter parameter are not preset is used, the encoder determines the filter shape and the filter parameter during the filter selection. The encoder may use a predetermined optimization criterion to select, from multiple groups of candidate filters or multiple candidate filters, a filter and a shape and filter parameter thereof that may enable the optimization criterion to reach an optimal or locally optimal state. A common example of the optimization criterion is the rate-distortion optimization criterion. The encoder may use this optimization criterion method to select an optimal or locally optimal filter. The encoder writes identification information of the selected filter and, if necessary, the filter shape and the filter parameter to the bitstream. Optionally, the encoder may filter the prediction reference block using multiple cascaded different filters. In this case, the encoder may use a preset cascading order of the cascaded filters, for example, the DF filtering is performed first, and then the SAO filtering is performed. The encoder may also use a rate-distortion optimization method to determine a flexible cascading order of the cascaded filters and write information related to the cascading order of the cascaded filters into the bitstream.

An example of a method that may be used by the encoder to determine the filter shape and filtering parameter in the above filter bank is described below.

For the filter bank 1 and/or the filter bank 4 described above, the encoder does not need to perform any algorithm for determining the filter shape and the filter parameter.

For the filter bank 2, the filter bank 3 and/or the filter bank 5, the encoder first determines the undetermined filter shape and/or the undetermined filter parameter first. An example of the available method is to determine a filter shape and/or a filter parameter capable of minimizing an error between the filtered prediction reference block and the above-mentioned encoding block.

For the filter bank 6 described above, an example of the filtering mode and the filtering parameter used for filtering the pixel sampling value in the prediction reference block for the IBC mode is described below. In the example, the filter set allowed for use includes the DF filter and/or the SAO filter. The method that may be used to determine filtering parameters of the DF filter and/or the SAO filter includes at least one of the methods described below.

According to the pixel sampling value in the pixel in the prediction reference block and the encoding mode used by the pixel in the reference block, the encoder determines the filtering mode and the filtering parameter for filtering the pixel in the prediction reference block, and writes the relevant filtering parameter into the bitstream.

The encoder uses the pixel sampling value in the pixel in the prediction reference block to estimate the DF filtering strength and filtering parameter for the prediction reference block.

The encoder uses the DF filtering strength and filtering parameter of the slice and the coding unit where the encoded pixel in the prediction reference block is located.

The encoder estimates the SAO parameter of the coding tree unit (CTU) where the pixel in the prediction reference block is located according to the encoded pixel in the prediction reference block in the current picture.

In addition to the filter shape and the filtering parameter, the encoder needs to determine corresponding control indication information for the filtering process and write these control indication information into the bitstream. The encoder may determine the above-mentioned control indication information using the rate-distortion optimization method. The control indication information of the filtering process includes at least one of:

indication information indicating whether to filter the pixel in the prediction reference block;

indication information indicating whether to filter the pixel in the prediction reference block in the IBC mode;

indication information indicating whether to filter the pixel in the prediction reference block in the conventional inter prediction mode;

indication information of a filter used in filtering the pixel in the prediction reference block, including at least indication information of a filter type;

indication information of a filter used in filtering the pixel in the prediction reference block in the IBC mode;

indication information of a filter used in filtering the pixel in the prediction reference block in the conventional inter prediction mode;

filtering parameter information of a filter used in filtering the pixel in the prediction reference block, including at least information of a filter coefficient;

filtering parameter information of a filter used in filtering the pixel in the prediction reference block in the IBC mode; and filtering parameter information of a filter used in filtering the pixel in the prediction reference block in the conventional inter prediction mode.

The encoder writes the foregoing control indication information into a bitstream corresponding to a bitstream organizational unit. The bitstream includes at least one of:

one or more parameter set bitstreams;

a slice header information bitstream;

a bitstream corresponding to a block layer data unit where the encoding block is located;

a bitstream corresponding to a prediction block data unit in the encoding block; and a bitstream corresponding to user-defined data and/or a bitstream corresponding to supplemental extension information data.

Corresponding to different control indication information, the encoder may filter the sampling value in the pixel in the prediction reference block in one of the following operation manners.

In an operation manner 1, both the prediction reference block in the IBC mode and the prediction reference block in the conventional inter prediction mode are filtered, and the same filter is used.

In an operation manner 2, both the prediction reference block in the IBC mode and the prediction reference block in the conventional inter prediction mode are filtered, while different filters are used.

In an operation manner 3, the prediction reference block in the IBC mode is filtered, while the prediction reference block in the conventional inter prediction mode is not filtered.

In an operation manner 4, the prediction reference block in the IBC mode is not filtered, while the prediction reference block in the conventional inter prediction mode is filtered.

In an operation manner 5, neither the prediction reference block in the IBC mode nor the prediction reference block in the conventional inter prediction mode is filtered.

In particular, optionally, the encoder may filter the pixel sampling value in the pixel in the prediction reference block for the encoding block by using the method of determining and controlling the filter parameter for the picture and/or the slice layer, that is, in the encoding picture or the encoding slice, all of the encoding blocks using the IBC mode and/or the conventional inter prediction mode use the same filter and filter parameter. In this particular case, the encoder obtains the parameters related to the filtering process in a manner similar to the above-mentioned manner for the decoding block. The process is not limited. In an embodiment, the encoder may perform filtering process on the prediction reference picture before processing the encoding block in the encoding picture or in the encoding slice. In an alternative embodiment, the encoder performs filtering on the prediction reference block used by the encoding block in the process of encoding the block layer, which is different from the processing method in which the prediction reference picture is first filtered in the picture layer or in the slice layer.

In step S503, the encoder filters the pixel in the prediction reference block according to the determined filtering mode and filtering parameter.

The encoder filters one or more components of the pixel in the prediction reference block according to the determined filtering mode and filtering parameter.

When multiple filters are used, the encoder filters the pixel in the prediction reference block in a preset cascading order of the cascaded filters or in a cascading order of the cascaded filters indicated in the bitstream.

In step S504, the encoder constructs a prediction value for the pixel sampling value in the pixel in the encoding block using the filtered pixel sampling value in the prediction reference block.

Alternatively, the encoder directly takes the filtered pixel sampling value in the prediction reference block as the prediction value for the pixel sampling value at the corresponding position in the encoding block.

Alternatively, in a case where the encoding block uses two or more prediction reference blocks, the encoder uses a weighted sum of the filtered pixel sampling values of the two or more prediction reference blocks as the prediction value for the pixel sampling value at the corresponding position in the encoding block.

Alternatively, the encoder uses a multiplicative factor and/or an additive offset to linearly process the prediction value obtained using the above-mentioned method, and takes the processed prediction value as the prediction value for the encoding block. The encoder obtains values of the multiplicative factor and/or the additive offset by parsing the bitstream, or estimates the values of the multiplicative factor and/or the additive offset according to a reference picture.

Optional Embodiment 5

The optional embodiment 5 provides an embodiment of an electronic device including an encoder and/or a decoder.

The encoder generates a video bitstream using the encoder implementation of any one of the foregoing optional embodiment 2 and optional embodiment 4.

The decoder decodes the video bitstream using the decoder implementation of any one of the foregoing optional embodiment 1 and optional embodiment 3.

The electronic device in the optional embodiment 5 may be a bitstream generating device and a bitstream receiving and playing device in a video communication application, such as a mobile phone, a computer, a server, a settop box, a portable mobile terminal, a digital video camera, a television broadcasting system device, and the like.

In summary, the embodiments of the present disclosure achieve the following technical effects. The low prediction efficiency problem of the IBC mode in the related art caused by no filtering process performed on the picture in the IBC mode is solved, and the decoding efficiency and quality of the IBC mode are improved.

Another embodiment further provides a software configured to execute the technical solutions described in the above-mentioned embodiments and optional embodiments.

Another embodiment further provides a storage medium configured to store computer-executable instructions. The instructions, when executed by a processor, implement the encoding processing method described above.

Another embodiment further provides a storage medium configured to store computer-executable instructions. The instructions, when executed by a processor, implement the decoding processing method described above.

The storage medium includes, but is not limited to, an optical disk, a floppy disk, a hard disk, an erasable memory, and the like. It is to be noted that the terms "first", "second" and the like in the description, claims and drawings of the present disclosure are used to distinguish between similar objects and are not necessarily used to describe a particular order or sequence. It is to be understood that the objects used in this way are interchangeable where appropriate so that embodiments of the present disclosure described herein may also be implemented in a sequence not shown or described herein. In addition, the terms "including", "having" or any other variations thereof described herein are intended to encompass a non-exclusive inclusion. For example, a process, method, system, product or device that includes a series of steps or elements may include not only the expressly listed steps or elements but also other steps or elements that are not expressly listed or are inherent to such a process, method, system, product or device.

Apparently, it is to be understood by those skilled in the art that each of the above-mentioned modules or steps of the embodiments of the present disclosure may be implemented by a general-purpose computing apparatus, the modules or steps may be concentrated on a single computing apparatus or distributed on a network composed of multiple computing apparatuses, and alternatively, the modules or steps may be implemented by program codes executable by the computing apparatuses, so that the modules or steps may be stored in a storage apparatus and executed by the computing apparatuses. In some circumstances, the illustrated or described steps may be executed in sequences different from those described herein, or the modules or steps may be made into various integrated circuit modules separately, or multiple modules or steps therein may be made into a single integrated circuit module for implementation. In this way, the embodiments of the present disclosure are not limited to any specific combination of hardware and software.

The above are only optional embodiments of the present disclosure and are not intended to limit the present application, and for those skilled in the art, the present application may have various modifications and variations. Any modifications, equivalent substitutions, improvements and the like made within the spirit and principle of the present application should fall within the scope of the present application.

INDUSTRIAL APPLICABILITY

With the technical solutions provided by the embodiments of the present disclosure, the problem, in the related art, that no filtering process is performed on the picture in the IBC mode and thus the prediction efficiency of the IBC mode is low is solved, and the encoding efficiency and encoding quality of the IBC mode are improved.

What is claimed is:

1. An encoding processing method, comprising:
determining, based on a parameter information of an encoding block, a filtering process to be applied to a pixel in a reference block for the encoding block;
filtering the pixel in the reference block according to the filtering process;
constructing a pixel prediction value for the encoding block according to a filtered pixel sampling value in the reference block; and
encoding the encoding block according to the pixel prediction value.

2. The method of claim 1, wherein determining the filtering process comprises:
determining a filter and a filtering parameter according to at least one of the following information: encoding parameter information of the encoding block, a part of or all of reconstructed pixel sampling values of a picture in which the reference block is located, and a part or all of pixel sampling values of a picture in which the encoding block is located.

3. The method of claim 2, wherein determining the filter and the filtering parameter comprises: determining the filter and the filtering parameter used for the reference block for the encoding block by using a sample value in an encoded pixel and encoding parameter information of the encoding block.

4. The method of claim 1, wherein filtering the pixel in the prediction reference block according to the filter and the filtering parameter comprises: filtering one or more components of the pixel in the reference block according to the determined filter and the determined filter parameter.

5. The method of claim 1, wherein constructing the pixel prediction value according to the pixel sampling value in the reference block processed by the filter and the filtering parameter comprises:
taking the pixel sampling value as the pixel prediction value; or
taking a weighted sum of a plurality of pixel sampling values as the pixel prediction value.

6. The method of claim 1, wherein in response to determining that a plurality of cascaded filters are to be applied to the pixel in the reference block, the pixel in the reference block is filtered using a preset cascading order of the cascaded filters.

7. A decoding processing method, comprising:
determining, based on a parameter information of a decoding block, a filtering process to be applied to a pixel in a prediction reference block for a decoding block;
processing a pixel sampling value in the reference block by using the determined filtering process; and
constructing a pixel prediction value for the decoding block by using the processed pixel sampling value.

8. The method of claim 7, wherein the determining the filtering process comprises:
determining a filter and a filtering parameter used for the reference block for the decoding block by using a decoded pixel sample value and decoding parameter information of the decoding block.

9. The method of claim 7, wherein processing the pixel sampling value in the reference block by using the determined filter and the determined filtering parameter comprises:
filtering one or more components of the pixel in the reference block according to the determined filter and the determined filtering parameter.

10. The method of claim 7, wherein constructing the pixel prediction value by using the processed pixel comprises:
taking the pixel sampling value as the pixel prediction value; or
taking a weighted sum of a plurality of pixel sampling values as the pixel prediction value.

11. The method of claim 7, wherein in response to determining that a plurality of cascaded filters are to be applied to the pixel in the reference block, the pixel in the reference block is filtered in a preset cascading order of the cascaded filters.

12. An encoding processing device comprising a processor configured to:
determine, based on a parameter information of an encoding block, a filtering process to be applied to a pixel in a reference block for the encoding block;
filter the pixel in the reference block according to the filtering process;

construct a pixel prediction value for the encoding block according to a filtered pixel sampling value in the reference block; and encode the encoding block according to the pixel prediction value.

13. The encoding processing device of claim 12, wherein the processor is configured to:

determine a filter and a filtering parameter according to at least one of the following information: encoding parameter information of the encoding block, a part of or all of reconstructed pixel sampling values of a picture in which the reference block is located, and a part or all of pixel sampling values of a picture in which the encoding block is located.

14. The encoding processing device of claim 13, wherein the processor is configured to determine the filter and the filtering parameter by: determining the filter and the filtering parameter used for the reference block for the encoding block by using a sample value in an encoded pixel and encoding parameter information of the encoding block.

15. The encoding processing device of claim 12, wherein the processor is configured to filter the pixel in the prediction reference block according to the filter and the filtering parameter by: filtering one or more components of the pixel in the reference block according to the determined filter and the determined filter parameter.

16. The encoding processing device of claim 12, wherein the processor is configured to construct the pixel prediction value according to the pixel sampling value in the reference block processed by the filter and the filtering parameter by:

taking the pixel sampling value as the pixel prediction value; or taking a weighted sum of a plurality of pixel sampling values as the pixel prediction value.

17. The encoding processing device of claim 12, wherein in response to determining that a plurality of cascaded filters are to be applied to the pixel in the reference block, the pixel in the reference block is filtered using a preset cascading order of the cascaded filters.

18. A decoding processing device comprising a processor configured to:

determine, based on a parameter information of a decoding block, a filtering process to be applied to a pixel in a prediction reference block for a decoding block;

process a pixel sampling value in the reference block by using the determined filtering process; and construct a pixel prediction value for the decoding block by using the processed pixel sampling value.

19. The decoding processing device of claim 18, wherein the processor is configured to determine the filtering process by:

determining a filter and a filtering parameter used for the reference block for the decoding block by using a decoded pixel sample value and decoding parameter information of the decoding block.

20. The decoding processing device of claim 18, wherein the processor is configured to process the pixel sampling value in the reference block by using the determined filter and the determined filtering parameter by:

filtering one or more components of the pixel in the reference block according to the determined filter and the determined filtering parameter.

21. The decoding processing device of claim 18, wherein the processor is configured to construct the pixel prediction value by using the processed pixel by:

taking the pixel sampling value as the pixel prediction value; or taking a weighted sum of a plurality of pixel sampling values as the pixel prediction value.

22. The decoding processing device of claim 18, wherein in response to determining that a plurality of cascaded filters are to be applied to the pixel in the reference block, the pixel in the reference block is filtered in a preset cascading order of the cascaded filters.

\* \* \* \* \*